US007123409B2

(12) United States Patent
Umeya

(10) Patent No.: US 7,123,409 B2
(45) Date of Patent: Oct. 17, 2006

(54) PROJECTION SCREEN AND PROJECTION SYSTEM COMPRISING THE SAME

(75) Inventor: Masanori Umeya, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 134 days.

(21) Appl. No.: 10/910,766

(22) Filed: Aug. 4, 2004

(65) Prior Publication Data
US 2005/0041285 A1  Feb. 24, 2005

(30) Foreign Application Priority Data
Aug. 4, 2003   (JP)   ............................. 2003-286121

(51) Int. Cl.
  G03B 21/56   (2006.01)
  G02B 5/30    (2006.01)
  C09K 19/02   (2006.01)
  C09K 1/13    (2006.01)
  G02F 1/1335  (2006.01)
(52) U.S. Cl. ....................... 359/449; 359/454; 359/459; 359/500; 359/492; 359/452; 359/599; 359/487; 349/185; 349/87; 349/96; 349/176; 349/115
(58) Field of Classification Search ................ 359/449, 359/443, 454, 459, 500, 492, 452, 599, 487; 349/175, 185, 87, 96, 176, 115
See application file for complete search history.

(56) References Cited
U.S. PATENT DOCUMENTS
5,486,884 A * 1/1996 De Vaan .................... 353/122
(Continued)

FOREIGN PATENT DOCUMENTS
EP   0 648 048 A1   10/1994

JP   05-107660   4/1993
(Continued)

OTHER PUBLICATIONS
U.S. Appl. No. 10/864,876 filed, Aug. 10, 2004, Umeya.
(Continued)

Primary Examiner—W.B. Perkey
Assistant Examiner—Magda Cruz
(74) Attorney, Agent, or Firm—Oliff & Berridge, PLC

(57) ABSTRACT

The present invention provides a projection screen capable of sharply displaying an image by minimizing the influence of the loss of light that occurs on a polarized-light selective reflection layer and of providing high image visibility. A projection screen includes: a polarized-light selective reflection layer that selectively reflects a specific polarized-light component; and a substrate that supports the polarized-light selective reflection layer. The polarized-light selective reflection layer includes a plurality of partial selective reflection layers that are laminated to one another, and the partial selective reflection layers have cholesteric liquid crystalline structures, owing to which they selectively reflect a specific polarized-light component. The cholesteric liquid crystalline structure of each partial selective reflection layer comprises a plurality of helical structure parts that are different in direction of helical axis, and, owing to structural non-uniformity in the cholesteric liquid crystalline structure, diffuses light (imaging light) that is selectively reflected. The partial selective reflection layer (11a) is for selectively reflecting light in the green (G) color wave range, the partial selective reflection layer (11b) is for selectively reflecting light in the blue (B) color wave range, and the partial selective reflection layer (11c) is for selectively reflecting light in the red (R) color wave range. These partial selective reflection layers (11a, 11b and 11c) are successively laminated in this order from the substrate side.

18 Claims, 5 Drawing Sheets

U.S. PATENT DOCUMENTS 6,381,068 B1 * 4/2002 Harada et al. ............... 359/443
2003/0038918 A1 * 2/2003 Kashima et al. ............ 349/194

FOREIGN PATENT DOCUMENTS

| JP | 02-540445 | 11/2002 |
| JP | 05-003823 | 1/2005 |

OTHER PUBLICATIONS

"Bragg Reflection From Cholesteric Liquid Crystals," W.D. St. John, et al., Physical review E, vol. 51, No. 2, Feb. 1, 1995, pp. 1191-1198.

"Optical Properties of Diffusion-Type Cholesteric Liquid Crystalline Polymer Film," A. Shiozawa et al., Molecular and Liquid Crystals, vol. 364, 2001, pp. 464-478.

* cited by examiner

PROJECTION SCREEN AND PROJECTION SYSTEM COMPRISING THE SAME

BACKGROUND OF THE INVENTION

1. Field of the Invention

The present invention relates to a projection system in which imaging light emitted from a projector is projected on a projection screen to display thereon an image. More particularly, the present invention relates to a projection screen capable of sharply displaying an image and of providing high image visibility, and to a projection system comprising such a projection screen.

2. Background Art

A conventional projection system is usually as follows: imaging light emitted from a projector is projected on a projection screen, and viewers observe the light reflected from the projection screen as an image.

Typical examples of projection screens for use in such conventional projection systems include white-colored paper or cloth materials, and plastic films coated with inks that scatter white light. Besides, high-quality projection screens that comprise scattering layers containing beads, pearlescent pigments, or the like, capable of controlling the scattering of imaging light, are now commercially available.

Since projectors have become smaller in size and moderate in price in recent years, demand for household projectors such as projectors for family theaters is growing, and an increasing number of families are now enjoying projection systems. Household projection systems are often placed in living rooms or the like, which are usually so designed that environmental light such as sunlight and light from lighting fixtures come in abundantly. Therefore, projection screens for use in household projection systems are expected to show good image display performance even under bright environmental light.

However, the above-described conventional projection screens cannot show good image display performance under bright environmental light because they reflect not only imaging light but also environmental light such as sunlight and light from lighting fixtures.

In such a conventional projection system, differences in the intensity of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

However, since the above-described conventional projection screen reflects both imaging light and environmental light such as sunlight and light from lighting fixtures without distinction, both the white- and black-indication parts get lighter, and differences in brightness between white and black become small. For this reason, the conventional projection screen cannot satisfactorily provide good image display unless the influence of environmental light such as sunlight and light from lighting fixtures on the projection screen is suppressed by using a means for shading a room, or by placing the projection screen in a dark environment.

Under these circumstances, studies have been made on projection screens capable of showing good image display performance even under bright environmental light. There have so far been proposed projection screens utilizing, for example, holograms or polarized-light-separating layers (see Japanese Laid-Open Patent Publications No. 107660/1993 (Patent Document 1) and No. 540445/2002 (Patent Document 2)).

Of these conventional projection screens, those ones using holograms have the advantage that the white-indication part can be made lighter if their light scattering effect is properly controlled, so that they can show relatively good image display performance even under bright environment light. However, holograms have wavelength selectivity but no polarization selectivity, so that the projection screens using holograms can display images only with limited sharpness. Moreover, it is difficult to produce large-sized projection screens by utilizing holograms because of production problems.

On the other hand, on the above-described conventional projection screens using polarized-light-separating layers, it is possible to make the white-indication part lighter and the black-indication part darker. Therefore, these projection screens can sharply display images even under bright environmental light as compared with the projection screens using holograms.

In connection with such projection screens using polarized-light-separating layers, we already proposed a projection screen comprising a cholesteric liquid crystalline, polarized-light selective reflection layer, capable of scattering, owing to structural non-uniformity in the cholesteric liquid crystalline structure, imaging light when reflecting it, without lowering image visibility (Japanese Patent Application No. 165687/2003).

SUMMARY OF THE INVENTION

The present invention is to improve the invention of Japanese Patent Application No. 165687/2003, which is herein incorporated by reference. An object of the present invention is, therefore, to provide a projection screen capable of sharply displaying an image by minimizing the influence of the loss of light that occurs on a polarized-light selective reflection layer, and of providing high image visibility, and a projection system comprising such a projection screen.

The present invention provides, as a first aspect of the invention, a projection screen for displaying an image by reflecting imaging light projected, comprising: a polarized-light selective reflection layer that selectively reflects a specific polarized-light component and comprises at least two partial selective reflection layers laminated to each other, wherein the partial selective reflection layers have structures, owing to which they selectively reflect a specific polarized-light component; the structures of the partial selective reflection layers are made different so that the partial selective reflection layers selectively reflect light in different wave ranges for red (R), green (G) and blue (B) colors; and, in the polarized-light selective reflection layer, the partial selective reflection layer that selectively reflects light in the green (G) color wave range is situated on the side opposite to the imaging-light-incident side.

In the above-described first aspect of the invention, it is preferable that the specific polarized-light component be right- or left-handed circularly polarized light. The specific polarized-light component may also be linearly polarized light of one variation direction.

Further, in the above-described first aspect of the invention, it is preferable that the projection screen further comprises a diffusing element that diffuses light that is reflected from the polarized-light selective reflection layer, or that the polarized-light selective reflection layer itself has diffusing properties.

Furthermore, in the above-described first aspect of the invention, it is preferable that the polarized-light selective reflection layer has a cholesteric liquid crystalline structure and, owing to structural non-uniformity in the cholesteric liquid crystalline structure, diffuses light that is selectively reflected. In this case, it is preferable that the cholesteric liquid crystalline structure of each of the partial selective reflection layers comprises a plurality of helical-structure parts that are different in direction of helical axis.

Furthermore, in the above-described first aspect of the invention, it is preferable that the projection screen further comprises a substrate that supports the polarized-light selective reflection layer comprising the partial selective reflection layers, situated underneath the partial selective reflection layer that selectively reflects light in the green (G) color wave range. It is herein preferable that the substrate may be an absorptive substrate comprising a light-absorbing layer that absorbs light in the visible region, or a transparent substrate that transmits at least part of light in the visible region.

Furthermore, in the above-described first aspect of the invention, it is herein preferable that an intermediate layer having adhesion or barrier properties be provided between each neighboring two of the partial selective reflection layers in the polarized-light selective reflection layer.

Furthermore, in the above-described first aspect of the invention, it is preferable that the projection screen further comprises a functional layer containing at least one layer selected from the group consisting of a hard coat layer, an anti-glaring layer, an anti-reflection layer, an ultraviolet-light-absorbing layer and an antistatic layer. In the case where the functional layer is an anti-glaring layer, it is preferable that the anti-glaring layer comprises a layer with an irregularly roughened surface, isotropic with respect to refractive index. For example, a TAC film with a matte surface is conveniently used as the anti-glaring layer. Instead of providing such an anti-glaring layer, the imaging-light-incident-side surface of the polarized-light selective reflection layer may be roughened so that the polarized-light selective reflection layer shows anti-glaring properties because of the roughened surface.

Furthermore, in the above-described first aspect of the invention, it is preferable that each of the partial selective reflection layers be made from a polymerizable, liquid crystalline material.

The present invention provides, as a second aspect of the invention, a projection system comprising: a projection screen according to the above-described first aspect of the invention; and a projector that projects imaging light on the projection screen.

According to the present invention, the partial selective reflection layers in the polarized-light selective reflection layer are made to have different structures so that they selectively reflect light in different wave ranges for red (R), green (G) and blue (B) colors, and, in the polarized-light selective reflection layer, the partial selective reflection layer that selectively reflects light in the (G) green color wave range is positioned on the side opposite to the imaging-light-incident side. Light in the red (R), green (G) and blue (B) color wave ranges, entering from the viewer's side, are reflected at the corresponding partial selective reflection layers in the polarized-light selective reflection layer, and return to the viewer's side. In addition to a selective reflection wave range, color light in this specific wave range being selectively reflected, each of the partial selective reflection layers has side bands, light in these bands, not in the specific wave range of the color light, being selectively reflected (see FIG. 8 showing a selective reflection spectrum of light reflected from a cholesteric, polarized-light selective reflection layer). For this reason, the light reflected from one partial selective reflection layer toward the viewer's side is partly reflected at another partial selective reflection layer situated on the viewer's side of the former partial selective reflection layer because of the side bands which the latter partial selective reflection layer has. A part of this reflected light becomes stray light, which becomes the cause of the loss of light. In the present invention, the partial selective reflection layer that selectively reflects light in the wave range for green (G) color whose visibility is high is provided on the side apart from the viewer's side as compared with the partial selective reflection layers that selectively reflect light in the wave ranges for red (R) and blue (B) colors whose visibility is low. Therefore, the loss of light in the wave ranges for red (R) and blue (B) colors whose visibility is low is minimized, and light in the red (R), green (G) and blue (B) color wave ranges can be reflected so that the reflected light is excellent in balance from the viewpoint of visibility. The projection screen can thus sharply display an image.

Further, according to the present invention, the partial selective reflection layers in the polarized-light selective reflection layer selectively reflect only a specific polarized-light component (e.g., right-handed circularly polarized light), so that the polarized-light selective reflection layer can be made to reflect only approximately 50% of the unpolarized environmental light such as sunlight and light from lighting fixtures that are incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the partial selective reflection layers in the polarized-light selective reflection layer selectively reflect (e.g., right-handed circularly polarized light), the partial selective reflection layers in the polarized-light selective reflection layer can reflect nearly 100% of the imaging light projected, that is, the polarized-light selective reflection layer can efficiently reflect the imaging light.

Furthermore, according to the present invention, if each of the partial selective reflection layers in the polarized-light selective reflection layer is made to have a cholesteric liquid crystalline structure, and this cholesteric liquid crystalline structure is made structurally non-uniform (for example, the helical-structure parts of the cholesteric liquid crystalline structure have helical axes extending in different directions), the polarized-light selective reflection layer reflects imaging light not by specular reflection but by diffuse reflection, and the reflected light can thus be well recognized as an image. At this time, owing to structural non-uniformity in the cholesteric liquid crystalline structures, the partial selective reflection layers in the polarized-light selective reflection layer diffuse light that is selectively reflected, so that they can reflect a specific polarized-light component while diffusing it, and, at the same time, transmit the other light components without diffusing them. For this reason, the environmental light and imaging light that pass through the partial selective reflection layers in the polarized-light selective reflection layer do not undergo so-called depolarization, that is, the disturbance of the state of polarization, and it is thus possible to improve image visibility while maintaining the polarized-light-separating property inherent in the polarized-light selective reflection layer.

DETAILED DESCRIPTION OF PREFERRED EMBODIMENTS

By referring to the accompanying drawings, embodiments of the present invention will be described hereinafter.

Projection Screen

First of all, a projection screen according to an embodiment of the present invention will be described with reference to FIG. 1.

Figure 1:
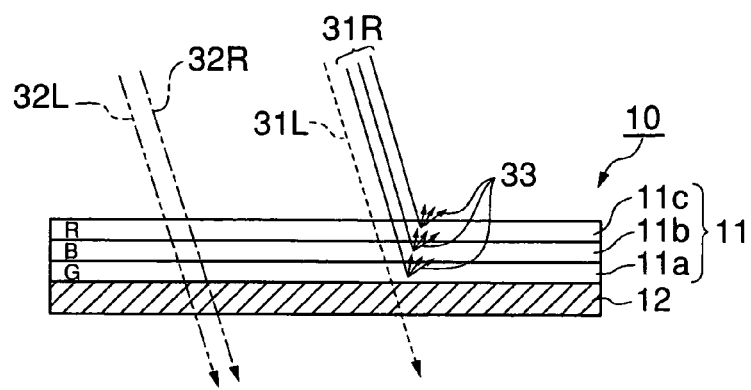
FIG. 1 is a diagrammatic sectional view showing a projection screen according to an embodiment of the present invention.

As shown in FIG. 1, a projection screen 10 according to this embodiment is for displaying an image by reflecting imaging light projected from the viewer's side (the upper side of the figure), and comprises a polarized-light selective reflection layer 11 capable of selectively reflecting a specific polarized-light component (e.g., right-handed circularly polarized light), and a substrate 12 that supports the polarized-light selective reflection layer 11.

Of these component layers, the polarized-light selective reflection layer 11 comprises three partial selective reflection layers 11a, 11b and 11c that are laminated to one another, and these partial selective reflection layers 11a, 11b and 11c have cholesteric, liquid crystalline structures, owing to which they selectively reflect a specific polarized-light component.

Each partial selective reflection layer 11a, 11b or 11c is made from a cholesteric, liquid crystalline composition, and physically, liquid crystalline molecules in this layer are aligned in helical fashion in which the directors of the liquid crystalline molecules are continuously rotated in the direction of the thickness of the layer.

Owing to such a physical alignment of the liquid crystalline molecules, each partial selective reflection layer 11a, 11b or 11c has the polarized-light-separating property, the property of separating a light component circularly polarized in one direction from a light component circularly polarized in the opposite direction. Namely, each partial selective reflection layer 11a, 11b or 11c converts unpolarized light that enters the layer along the helical axis into light in two different states of polarization (right-handed circularly polarized light and left-handed circularly polarized light), and transmits one of these light and reflects the other. This phenomenon is known as circular dichroism. If the direction of rotation of liquid crystalline molecular helix is properly selected, a light component circularly polarized in the same direction as this direction of rotation is selectively reflected.

In this case, the scattering of polarized light is maximized at the wavelength $\lambda_O$ given by the following equation (1):

$$\lambda_O = nav \cdot p, \quad (1)$$

wherein p is the helical pitch in the helical structure consisting of liquid crystalline molecules (the length of one liquid crystalline molecular helix), and nav is the mean refractive index on a plane perpendicular to the helical axis.

On the other hand, the width $\Delta\lambda$ of the wave range in which the wavelength of light to be reflected falls is given by the following equation (2):

$$\Delta\lambda = \Delta n \cdot p, \quad (2)$$

wherein $\Delta n$ is the value of birefringence.

Figure 8:
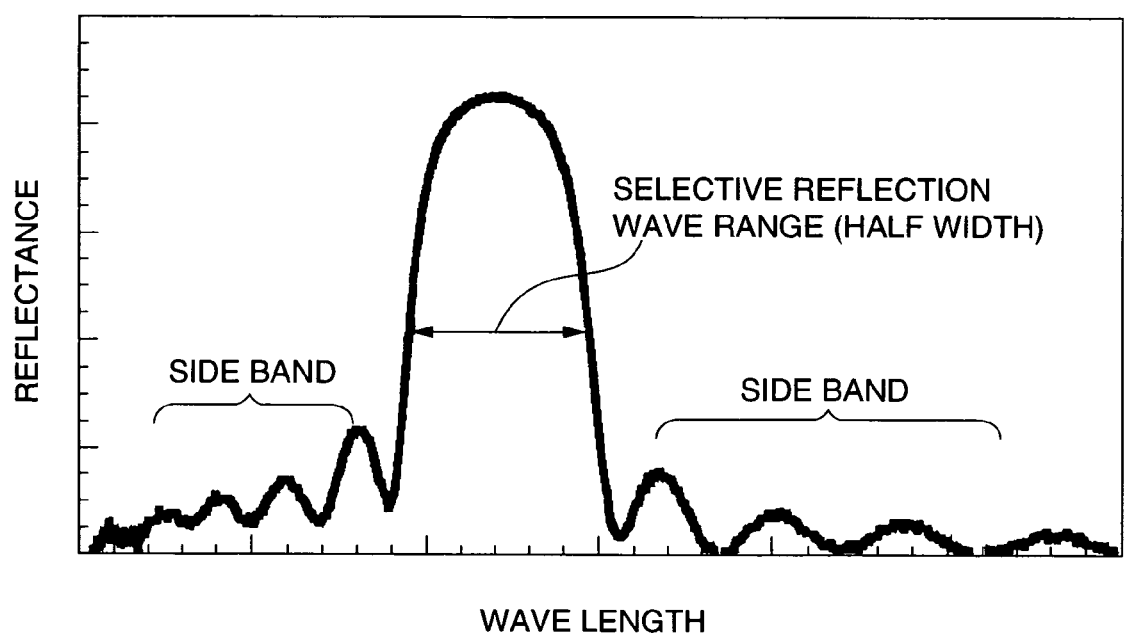
FIG. 8 is a view showing a selective reflection spectrum of light reflected from a cholesteric, polarized-light selective reflection layer (partial selective reflection layer).

Namely, as shown in FIG. 1, of the unpolarized light that has entered the projection screen 10 from the viewer's side and has been split into right-handed circularly polarized light 31R and left-handed circularly polarized light 31L in the selective reflection wave range and into right-handed circularly polarized light 32R and left-handed circularly polarized light 32L not in the selective reflection wave range, one of the circularly polarized-light components in the wave range (selective reflection wave range) with the width $\Delta\lambda$, centered at the wavelength $\lambda_O$ (e.g., right-handed circularly polarized light 31R in the selective reflection wave range) is reflected from the partial selective reflection layers 11a, 11b and 11c as reflected light 33, and the other light (e.g., left-handed circularly polarized light 31L in the selective reflection wave range, and right-handed circularly polarized light 32R and left-handed circularly polarized light 32L not in the selective reflection wave range) pass through the partial selective reflection layers 11a, 11b and 11c, owing to the above-described polarized-light-separating property. FIG. 8 is a diagram showing a selective reflection spectrum of such reflected light 33. As shown in FIG. 8, in addition to a selective reflection wave range, color light in this specific wave range being selectively reflected, each partial selective reflection layer 11a, 11b or 11c has side bands, light in these bands, not in the specific wave range of the color light, being selectively reflected.

Figure 2A:
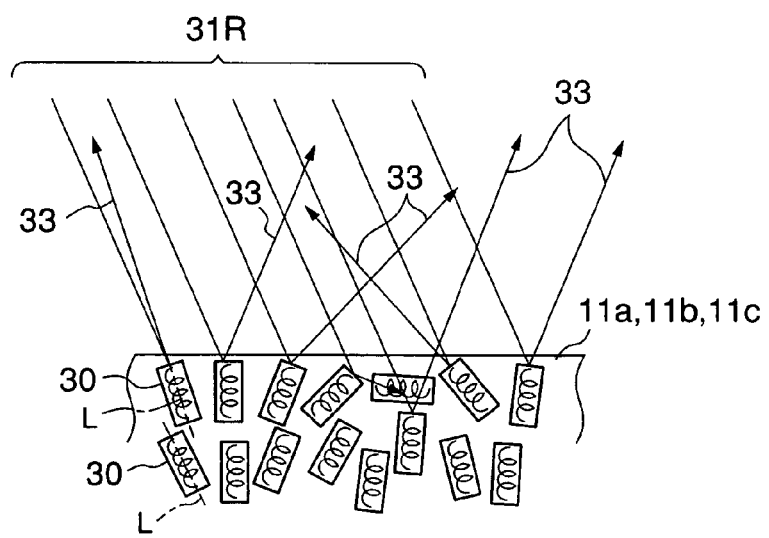
FIGS. 2A and 2B are illustrations for explaining the state of orientation of and optical function of the polarized-light selective reflection layer in the projection screen shown in FIG. 1.

The cholesteric liquid crystalline structure of each partial selective reflection layer 11a, 11b or 11c comprises a plurality of helical-structure parts 30 that are different in direction of helical axis L, as shown in FIG. 2A. Owing to structural non-uniformity in such a cholesteric liquid crystalline structure, each partial selective reflection layer 11a, 11b or 11c diffuses light (reflected light 33) that is selectively reflected. The state in which the cholesteric liquid crystalline structure is structurally non-uniform herein includes: the state in which the helical-structure parts 30 of the cholesteric liquid crystalline structure are different in direction of helical axis L; the state in which at least some of the planes of nematic layers (the planes on which the directors of liquid crystalline molecules point in the same X-Y direction) are not parallel to the plane of the polarized-light selective reflection layer 11 (the state in which, in a sectional TEM photo of a cholesteric liquid crystalline structure specimen that has been stained, continuous curves that appear as light-and-dark patterns are not parallel to the substrate plane); and the state in which finely divided particles of a cholesteric liquid crystal are dispersed in the cholesteric liquid crystalline structure as a pigment. The "diffusion" that is caused by such structural non-uniformity in the cholesteric liquid crystalline structure means that the light (imaging light) reflected from the projection screen 10 is spread or scattered to such an extent that viewers can recognize the reflected light as an image.

Figure 2B:
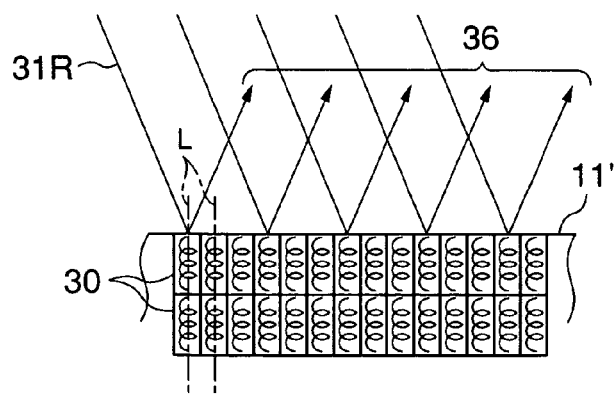

On the contrary, a conventional cholesteric liquid crystalline structure is in the sate of planar orientation, and the helical axes L in helical-structure parts 30 of the cholesteric liquid crystalline structure of a polarized-light selective reflection layer 11' extend in parallel in the direction of the thickness of the layer, as shown in FIG. 2B. Therefore, when the polarized-light selective reflection layer 11' selectively reflects light (reflected light 36), specular reflection occurs.

The partial selective reflection layers 11a, 11b and 11c in the polarized-light selective reflection layer 11 shown in FIG. 1 have cholesteric liquid crystalline structures whose helical pitches are made different so that they can selectively reflect light in different wave ranges, included in the visible region (e.g., the wave range of 400 to 700 nm), for red (R), green (G) is and blue (B) colors. It is herein preferable to use, as the red (R), green (G) and blue (B) color wave ranges, the wave ranges of imaging light projected from a projector such as a liquid crystal projector (e.g., assuming that light is vertically incident on the partial selective reflection layers 11a, 11b and 11c, the above wave ranges are the selective reflection wave ranges whose center wavelengths are 430–460 nm, 540–570 nm, and 580–620 nm).

The wave ranges of 430 to 460 nm, 540 to 570 nm, and 580 to 620 nm that are used as the red (R), green (G) and blue (B) color wave ranges, respectively, are wave ranges commonly used for color filters, light sources, or the like for use in displays that produce white color by the three primary colors. Red (R), green (G) and blue (B) colors are shown as line spectra maximized at specific wavelengths (e.g., in the case of green (G) color, this wavelength is typically 550 nm). However, these line spectra have certain widths, and moreover, the projected light have wavelengths that vary depending upon the design of the projector, the type of the light source, and the like. It is, therefore, preferable that the wave range for each color has a width of 30 to 40 nm. If the red (R), green (G) and blue (B) color wave ranges are set outside the above-described respective ranges, it is impossible to produce pure white, and only yellowish or reddish white is obtained.

In this embodiment, in order to minimize the influence of the loss of light, the partial selective reflection layer 11a that selectively reflects light in the green (G) color wave range, the partial selective reflection layer 11b that selectively reflects light in the blue (B) color wave range, and the partial selective reflection layer 11c that selectively reflects light in the red (R) color wave range are successively laminated in this order from the substrate 12 side, as shown in FIG. 1. Namely, the partial selective reflection layer 11a that selectively reflects light in the green (G) color wave range is provided on the side opposite to the imaging-light-incident side (on the substrate 12 side).

It is preferable that each partial selective reflection layer 11a, 11b or 11c be made to have such a thickness that it can reflect nearly 100% of light in a specific state of polarization that is selectively reflected (such a thickness that the reflectance is saturated). This is because when each partial selective reflection layer 11a, 11b or 11c has a reflectance of less than 100% for a specific polarized-light component that is selectively reflected (e.g., right-handed circularly polarized light), it cannot efficiently reflect the imaging light. Although the reflectance of each partial selective reflection layer 11a, 11b or 11c depends directly on the number of helical turns, it depends indirectly on the thickness of each partial selective reflection layer 11a, 11b or 11c if the helical pitch is fixed. Specifically, it is said that approximately 4 to 8 helical turns are needed to obtain a reflectance of 100%. Therefore, the partial selective reflection layer 11a, 11b or 11c that reflects light in the red (R), green (G) or blue (B) color wave range is required to have a thickness of approximately 1 to 10 μm although this thickness varies depending on the type of the components of the liquid crystalline composition used for forming this layer and on the selective reflection wave range of this layer. On the other hand, the partial selective reflection layer 11a, 11b or 11c should not be made thick limitlessly because if these layers are excessively thick, it becomes difficult to control the orientation of these layers, the layers cannot be made uniform, and the materials themselves for these layers absorb light to a greater extent. For this reason, it is appropriate that each partial selective reflection layer has a thickness in the above-described range.

Next, explanation for the substrate 12 will be given below.

The substrate 12 is for supporting the polarized-light selective reflection layer 11, and a material selected from plastic films, metals, paper, cloth, glass, and the like can be used for forming the substrate 12.

It is preferable that the substrate 12 comprises a light-absorbing layer capable of absorbing light in the visible region. Specifically, for example, the substrate 12 may be made of an acrylic sheet or plastic film in which a black pigment is incorporated (e.g., a black PET film in which carbon is incorporated)(in this case, the substrate 12 itself serves as a light-absorbing layer (light-absorptive substrate)), or a light-absorbing layer comprising a black pigment or the like may be formed on one surface of a transparent support film such as a plastic film. By this, of the unpolarized light entering the projection screen 10 from the viewer's side, those light that are inherently not reflected from the projection screen 10 as reflected light (left-handed circularly polarized light in the selective reflection wave range, and right-handed circularly polarized light and left-handed circularly polarized light not in the selective reflection wave range) and the light that enters the projection screen 10 from the backside are absorbed by the substrate 12. It is, therefore, possible to effectively prevent reflection of environmental light such as sunlight and light from lighting fixtures and production of stray light from imaging light.

Examples of plastic films that can be used as materials for the substrate 12 include films of such thermoplastic polymers as polycarbonate polymers, polyester polymers including polyethylene terephthalate, polyimide polymers, polysulfone polymers, polyether sulfone polymers, polystyrene polymers, polyolefin polymers including polyethylene and polypropylene, polyvinyl alcohol polymers, cellulose acetate polymers, polyvinyl chloride polymers, polyacrylate polymers, and polymethyl methacrylate polymers. Materials for the substrate 12 are not limited to the above-described polymers, and it is also possible to use such materials as metals, paper, cloth and glass.

Lamination of the partial selective reflection layers 11a, 11b and 11c to the substrate 12 is usually conducted by applying cholesteric liquid crystalline compositions and then subjecting the applied layers to aligning treatment and curing treatment, as will be described later.

In the above-described lamination process, it is necessary that the cholesteric liquid crystalline structure of each partial selective reflection layer 11a, 11b or 11c be made not in the state of planar orientation. It is, therefore, preferable to use, as the substrate 12, a material whose surface to which the liquid crystalline composition will be applied has no aligning power. However, even when a material whose surface to which the liquid crystalline composition will be applied has aligning power like a stretched film is used, the cholesteric liquid crystalline structure of each partial selective reflection layer 11a, 11b or 11c can be made not in the state of planar orientation if this surface of the material is subjected in advance to surface treatment, the components of the liquid crystalline composition are properly selected, or the conditions under which the liquid crystalline composition is oriented are controlled.

A process for producing the above-described projection screen 10 will be described hereinafter.

The substrate 12 to which the polarized-light selective reflection layer 11 will be laminated is firstly prepared. The surface of the substrate 12 to which a liquid crystalline composition will be applied is made to have no aligning power.

Thereafter, a cholesteric liquid crystalline composition is applied to the above-prepared substrate 12 and is then subjected to aligning treatment and curing treatment, whereby a first partial selective reflection layer 11a is laminated (fixed) to the substrate 12.

The steps (the steps of application, alignment and curing) for laminating (fixing) the first partial selective reflection layer 11a to the substrate 12 will be described in detail hereinafter.

(Step of Application)

In the step of application, a cholesteric liquid crystalline composition is applied to the substrate 12 to form thereon a cholesteric liquid crystal layer. Any of the known methods can be employed to apply the liquid crystalline composition to the substrate 12. Specifically, a roll, gravure, bar, slide, die, slit, or dip coating method can be used for this purpose.

In the case where a plastic film is used as the substrate 12, a film coating method using a so-called roll-to-roll system may be used.

For the liquid crystalline composition that is applied to the substrate 12, a cholesteric, chiral nematic liquid crystal or a cholesteric liquid crystal may be used. Although any liquid crystalline material can be used as long as it can develop a cholesteric liquid crystalline structure, particularly preferable one for obtaining, after curing, an optically stable, partial selective reflection layer 11a is a polymerizable liquid crystalline material having polymerizable functional groups at both ends of its molecule.

Explanation will be given below with reference to the case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material to make the resulting liquid crystalline composition cholesteric as a whole. By varying the chiral power by changing the type of the chiral agent used, or by varying the chiral agent concentration, it is possible to control the center wavelength of the selective reflection wave range that varies according to the molecular structure of the polymerizable liquid crystalline material. To the liquid crystalline composition, a polymerization initiator and other proper additives are added.

Examples of polymerizable, nematic liquid crystalline materials include compounds represented by the following general formulae (1) and (2-i) to (2-xi). These compounds may be used either singly or in combination.

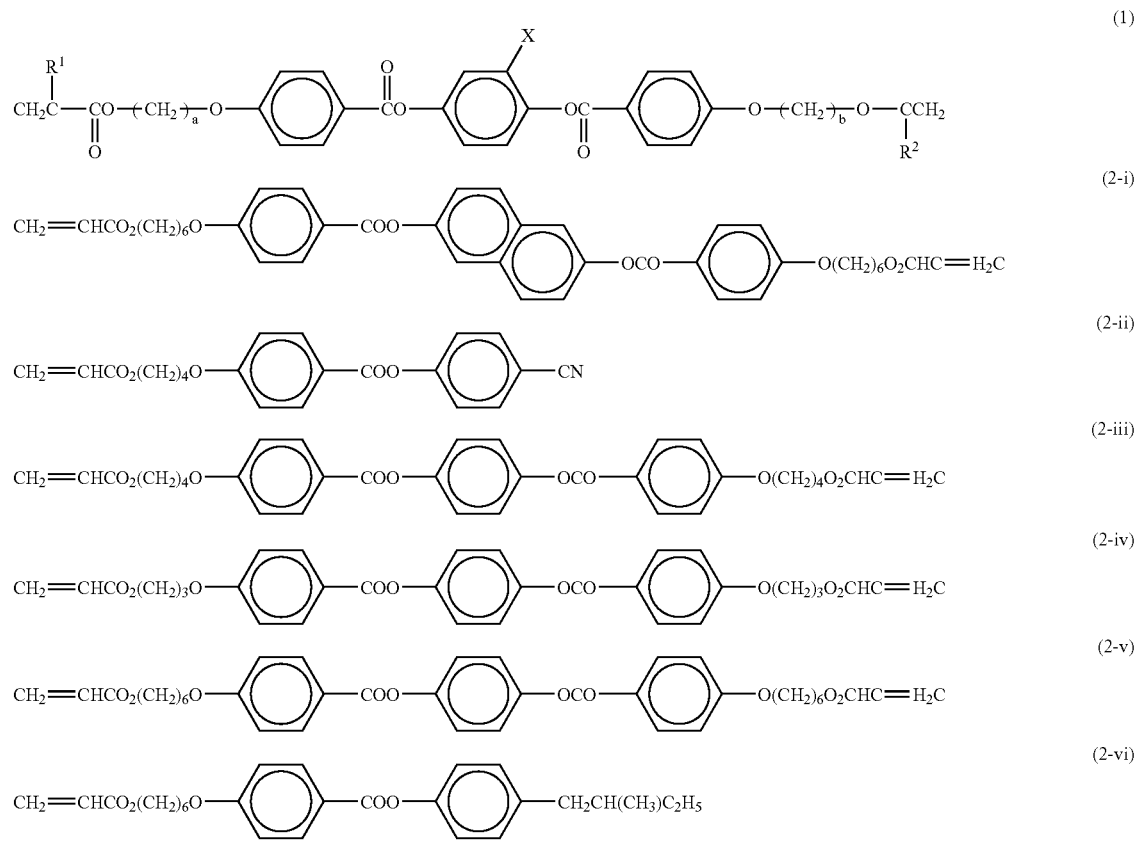

-continued

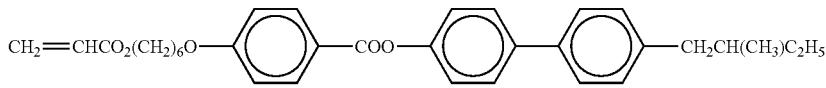
(2-vii)

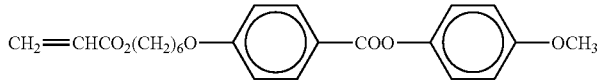
(2-viii)

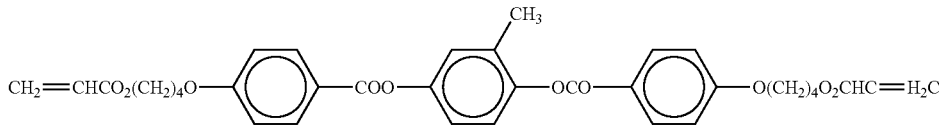
(2-ix)

(2-x)

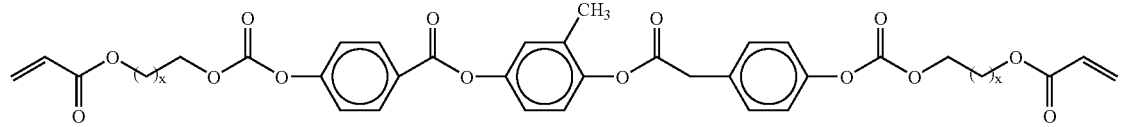
(2-xi)

wherein X is an integer of 2 to 5

In the above general formula (1), $R^1$ and $R^2$ independently represent hydrogen or methyl group. It is, however, preferable that both $R^1$ and $R^2$ represent hydrogen because a liquid crystalline composition containing such a compound shows a liquid crystal phase at temperatures in a wider range. X is hydrogen, chlorine, bromine, iodine, an alkyl group having 1 to 4 carbon atoms, methoxy group, cyano group or nitro group, preferably chlorine or methyl group. Further, in the above general formula (1), a and b that denote the chain lengths of the alkylene groups that serve as spacers between the (meth)acryloyloxy groups on both ends of the molecule and the aromatic rings are independently an integer of 2 to 12, preferably an integer of 4 to 10, more preferably an integer of 6 to 9. Those compounds represented by the general formula (1) in which a=b=0 are unstable, easily undergo hydrolysis, and have high crystallinity. On the other hand, those compounds represented by the general formula (1) in which a and b are independently an integer of 13 or more have low isotropic transition temperatures (TI's). Since these compounds show liquid crystal phases at temperatures in narrow ranges, they are undesirable.

Although a polymerizable liquid crystal monomer is, in the above description, used as the polymerizable, nematic liquid crystalline material, it is also possible to use, as the polymerizable, nematic liquid crystal material, a polymerizable liquid crystal oligomer or polymer, a liquid crystal polymer, or the like, properly selected from conventionally proposed ones.

On the other hand, the chiral agent is a low molecular weight compound containing an optically active site, having usually a molecular weight of not more than 1,500. The chiral agent is used in order to convert the positive monoaxially-nematic structure of a polymerizable, nematic liquid crystalline material into a helical structure. Any type of low molecular weight compounds may be used as the chiral agent as long as it is compatible with the polymerizable, nematic liquid crystalline material in the state of solution or melt and can make the liquid crystalline structure helical without impairing the liquid crystallinity of the material.

The chiral agent that is used for making the structure of the liquid crystal helical is required to have any type of chirality at least in its molecule. Examples of chiral agents useful herein include those compounds having 1, or 2 or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals such as a chiral dopant liquid crystal "S-811" manufactured by Merck KGaA, Germany.

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is non-polymerizable, the liquid crystalline composition has reduced hardenability, and the cured film is poor in reliability. Moreover, the use of a large amount of a chiral agent containing an optically active site increases the cost of the liquid crystalline composition. Therefore, to form a partial selective reflection layer having a cholesteric structure with a short helical pitch, it is preferable to select, as the optically-active-site-containing chiral agent to be incorporated in the liquid crystalline composition, a chiral agent whose helical-structure-developing action is great. Specifically, it is preferable to use one of the compounds represented by the following general formulae (3), (4) and (5), which are low-molecular-weight compounds whose molecules are axially chiral.

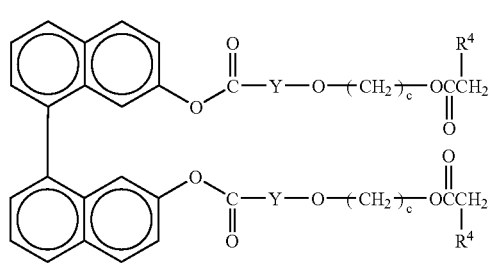
(3)
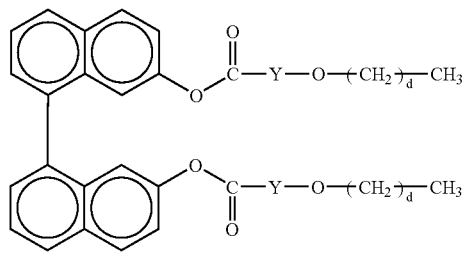
(4)
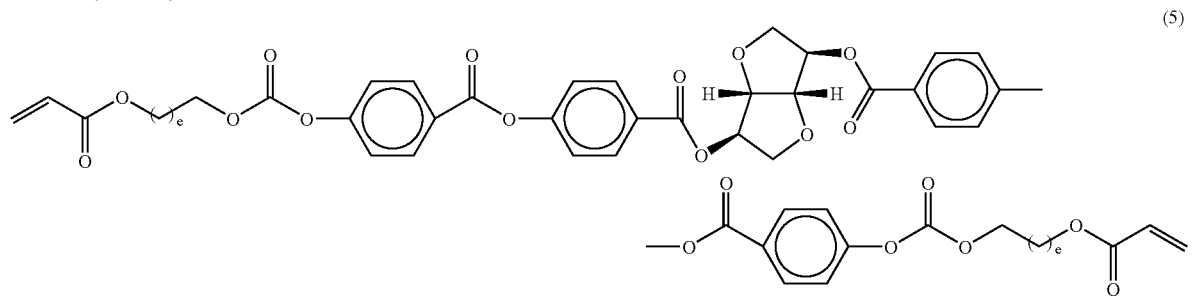
(5)
wherein e is an integer of 2 to 5
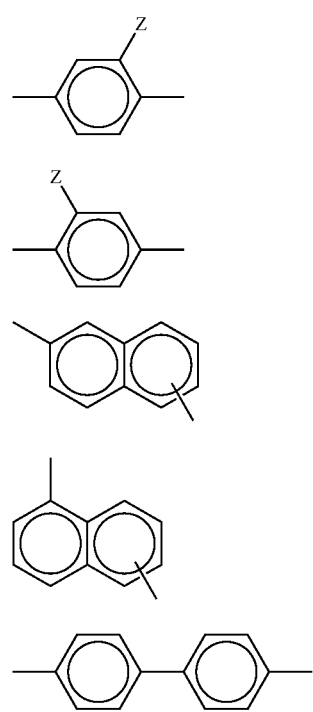
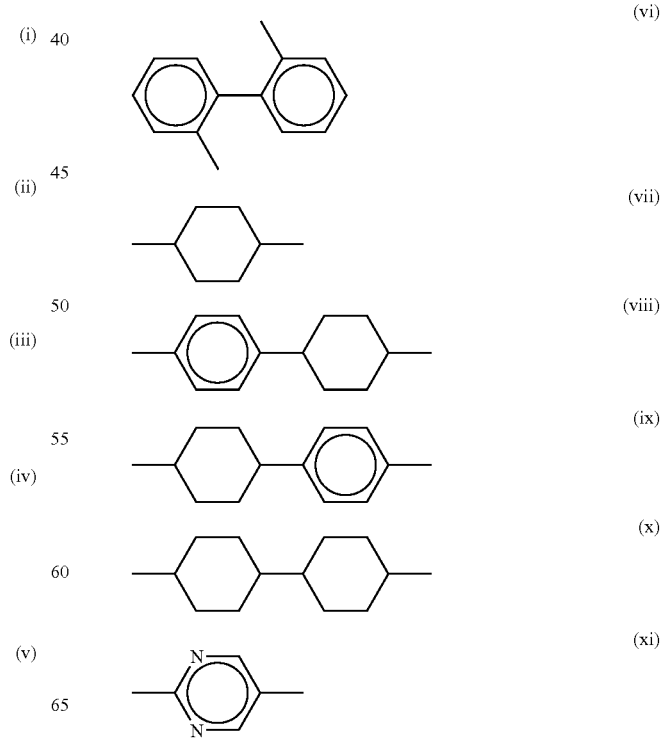

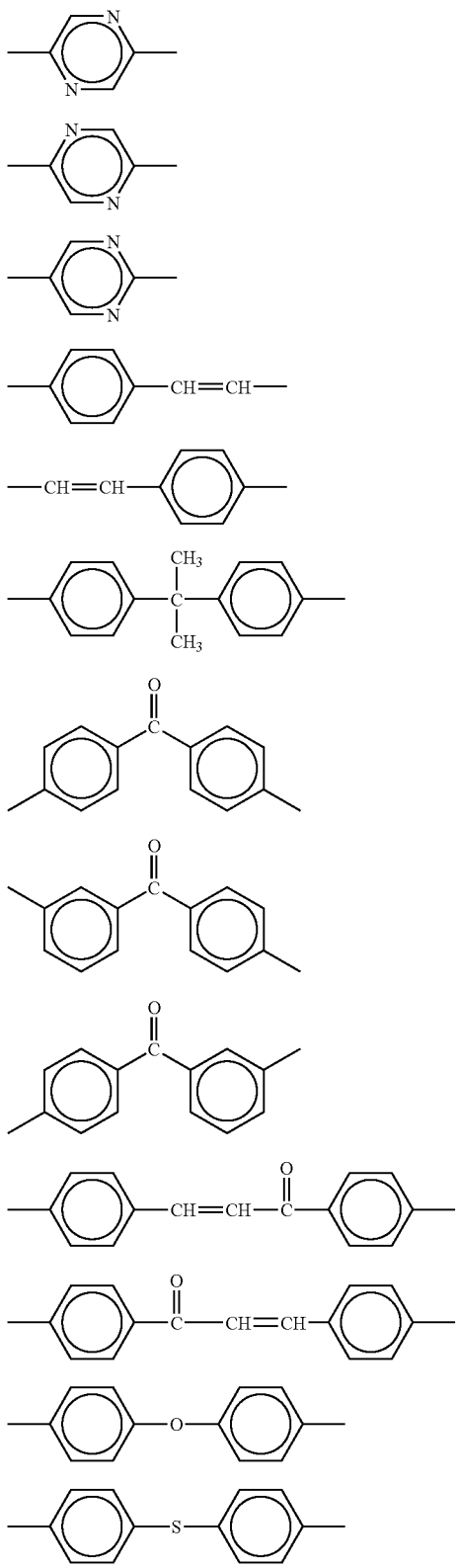

In the above general formula (3) or (4), R⁴ represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Those compounds represented by the above general formula (3) or (4) in which c or d is 0 or 1 are poor in stability, easily undergo hydrolysis, and have high crystallinity. On the other hand, those compounds represented by the general formula (3) or (4) in which c or d is 13 or more have low melting points (Tm's). These compounds are less compatible with the polymerizable, nematic liquid crystalline material, so that a liquid crystalline composition containing such a compound as the chiral agent may cause phase separation depending on the concentration of the compound.

The chiral agent is not necessarily polymerizable. However, if the chiral agent is polymerizable, it is polymerized with the polymerizable, nematic liquid crystalline material to give a stably fixed cholesteric structure. Therefore, from the viewpoint of thermal stability and the like, it is desirable that the chiral agent be polymerizable. In particular, the use of a chiral agent having polymerizable functional groups at both ends of its molecule is preferable to obtain a partial selective reflection layer 11*a* excellent in heat resistance.

The content of the chiral agent in the liquid crystalline composition is optimally decided in consideration of the helical-structure-developing ability of the chiral agent, the cholesteric liquid crystalline structure of the resulting partial selective reflection layer 11*a*, and so forth. Although the amount of the chiral agent to be added greatly varies depending upon the components of the liquid crystalline composition, it is from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. In the case where the amount of the chiral agent added is smaller than this range, there is a possibility that the liquid crystalline composition cannot fully become cholesteric. On the other hand, when the amount of the chiral agent added exceeds the above-described range, the alignment of liquid crystalline molecules is impeded, which may adversely affect the liquid crystalline composition in the course of curing using activating radiation or the like.

Although the liquid crystalline composition can be applied as it is to the substrate 12, it may be dissolved in a suitable solvent such as an organic solvent to give an ink in order to make the viscosity of the liquid crystalline composition fit for an applicator or to attain excellent alignment of liquid crystalline molecules.

Although any solvent can be used for the above purpose as long as it can dissolve the above-described polymerizable liquid crystalline material, it is preferable that the solvent does not attack the substrate 12. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted to any degree. However, considering that a liquid crystal itself is a material having low solubility and high viscosity, it is preferable to dilute the polymerizable liquid crystalline material to such a degree that the content of the liquid crystalline material in the diluted solution is in the order of preferably 5 to 50%, more preferably 10 to 30%.

(Step of Alignment)

After applying the liquid crystalline composition to the substrate 12 to form thereon a cholesteric liquid crystal layer in the above-described step of application, the cholesteric liquid crystal layer is, in the step of alignment, held at a predetermined temperature at which the cholesteric liquid crystal layer develops a cholesteric liquid crystalline structure, thereby aligning liquid crystalline molecules in the cholesteric liquid crystal layer.

The cholesteric liquid crystalline structure of the partial selective reflection layer 11a that should be finally obtained is one not in the state of planar orientation but in such a state of orientation as is shown in FIG. 2A, in which a plurality of the helical-structure parts 30 that are different in direction of helical axis L are present. Even so, it is necessary to conduct alignment treatment. Namely, although it is not necessary to align, in one direction on the substrate 12, the directors of liquid crystalline molecules in the cholesteric liquid crystalline structure, it is necessary to conduct such alignment treatment that a plurality of the helical-structure parts 30 are produced in the cholesteric liquid crystalline structure.

When the cholesteric liquid crystal layer formed on the substrate 12 is held at a predetermined temperature at which the cholesteric liquid crystal layer develops a cholesteric liquid crystalline structure, it shows a liquid crystal phase. At this time, owing to the self-accumulating action of liquid crystalline molecules themselves, continuous rotation of the directors of the liquid crystalline molecules occurs in the direction of the thickness of the layer, and a helical-structure is produced. It is possible to fix this cholesteric liquid crystalline structure in a liquid crystal phase state by curing the cholesteric liquid crystal layer using such a technique as will be described later.

In the case where the liquid crystalline composition applied to the substrate 12 contains a solvent, the step of alignment is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time (heating time) is preferably from 15 to 600 seconds, more preferably from 30 to 180 seconds. After once conducting the drying treatment, if it is realized that the liquid crystal layer is not fully orientated, this layer may be further heated accordingly. In the case where a vacuum drying technique is used in this drying treatment, it is preferable to separately conduct heat treatment in order to align liquid crystalline molecules.

(Step of Curing)

After aligning liquid crystalline molecules in the cholesteric liquid crystal layer in the above-described step of alignment, the cholesteric liquid crystal layer is cured in the step of curing, thereby fixing the cholesteric liquid crystalline structure that is in the liquid crystal phase state.

To effect the step of curing, it is possible to use: (1) a method in which the solvent contained in the liquid crystalline composition is evaporated; (2) a method in which liquid crystalline molecules in the liquid crystalline composition are thermally polymerized; (3) a method in which liquid crystalline molecules in the liquid crystalline composition are polymerized by the application of radiation; or (4) any combination of these methods.

Of the above methods, the method (1) is suitable for the case where a liquid crystal polymer is used as the polymerizable, nematic liquid crystal material that is incorporated in the liquid crystalline composition for forming the cholesteric liquid crystal layer. In this method, the liquid crystal polymer is dissolved in such a solvent as an organic solvent, and this solution is applied to the substrate 12. In this case, a solidified, cholesteric liquid crystal layer can be obtained by simply removing the solvent by drying. The type of the solvent, the drying conditions, and so on are the same as those ones that are used in the aforementioned steps of application and alignment.

The above-described method (2) is for curing the cholesteric liquid crystal layer by thermally polymerizing liquid crystalline molecules in the liquid crystalline composition by heating. In this method, the sate of bonding of the liquid crystalline molecules varies according to heating (baking) temperature. Therefore, if the cholesteric liquid crystal layer is heated non-uniformly, the cured layer cannot be uniform in physical properties such as film hardness and in optical properties. In order to limit variations in film hardness to ±10%, it is preferable to control the heating temperature so that it varies only within ±5%, preferably ±2%.

Any method may be employed to heat the cholesteric liquid crystal layer formed on the substrate 12 as long as it can provide uniformity in heating temperature. The liquid crystal layer may be placed directly on a hot plate and held as it is, or placed indirectly on a hot plate with a thin air layer interposed between the liquid crystal layer and the hot plate and held parallel with the hot plate. Besides, a method using a heater capable of heating the whole of a particular space, such as an oven, may be employed, where the liquid crystal layer is placed in or passed through such a heater. If a film coater or the like is used, it is preferable to make the drying zone long enough to make the heating time sufficiently long.

The heating temperature required is usually as high as 100° C. or more. However, considering the heat resistance of the substrate 12, it is preferable to limit this temperature to below approximately 150° C. If a specialized film or the like having significantly high heat resistance is used as the substrate 12, the heating temperature can be made as high as 150° C. or more.

The above-described method (3) is for curing the cholesteric liquid crystal layer by photo-polymerizing liquid crystalline molecules in the liquid crystalline composition by the application of radiation. In this method, electron beams, ultraviolet rays, or the like suitable for the conditions can be used as the radiation. In general, ultraviolet light is preferred because of the simplicity of ultraviolet light irradiation systems. The wavelength of ultraviolet light useful herein is from 250 to 400 nm. If ultraviolet light is used, it is preferable to incorporate a photopolymerization initiator in the liquid crystalline composition in advance.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-choloro-4-propoxythioxanthone. In addition to photopolymerization initiators, sensitizers may be added to the liquid crystalline composition unless they hinder the attainment of the object of the present invention.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

A projection screen 10 comprising a polarized-light selective reflection layer 11 composed of a plurality of partial selective reflection layers 11a, 11b and 11c can be obtained by repeatedly conducting a series of the above-described steps (the steps of application, alignment and curing) to successively form, on the partial selective reflection layer 11a, the other cholesteric liquid crystal layers (partial selective reflection layers). Namely, by successively laminating a plurality of cholesteric liquid crystal layers to the substrate 12 while controlling the center wavelength of the selective reflection wave range of each cholesteric, liquid crystalline composition to be applied, it is possible to obtain a projection screen 10 comprising, as the polarized-selective reflection layer 11, the partial selective reflection layer 11a that selectively reflects light in the green (G) color wave range, the partial selective reflection layer 11b that selectively reflects light in the blue (B) color wave range, and the partial selective reflection layer 11c that selectively reflects light in the red (R) color wave range, laminated successively in this order from the substrate 12 side.

In this case, as long as the underlying cholesteric liquid crystal layer has been solidified, a liquid crystalline composition for forming the second or later cholesteric liquid crystal layer can be applied by using the same technique as in the formation of the first liquid crystal layer. In this case, continuity is produced between the cholesteric liquid crystalline structure (the state of orientation) of the upper cholesteric liquid crystal layer and that of the lower cholesteric liquid crystal layer. It is, therefore, unnecessary to provide an alignment-controlling layer or the like between these two cholesteric liquid crystal layers. However, an intermediate layer such as an adherent layer may be provided between these two cholesteric liquid crystal layers, as needed.

Thus, according to this embodiment, in the cholesteric liquid crystalline structures of the partial selective reflection layers 11a, 11b and 11c in the polarized-light selective reflection layer 11, the helical pitches are made different from one another so that the partial selective reflection layers selectively reflect light in different wave ranges for red (R), green (G) and blue (B) colors, and, in the polarized-light selective reflection layer 11, the partial selective reflection layer 11a that selectively reflects light in the green (G) color wave range is provided on the side opposite to the imaging-light-incident side (on the substrate 12 side). Namely, the partial selective reflection layer 11a that selectively reflects light in the wave range for green (G) color whose visibility is high is provided on the side apart from the viewer's side (on the substrate 12 side) as compared with the partial selective reflection layers 11b and 11c that selectively reflect light in the wave ranges for red (R) and blue (B) colors whose visibility is low. Therefore, although light in the green (G) color wave range that is reflected at the partial selective reflection layer 11a and returns to the viewer's side is reflected owing to the side bands of the partial selective reflection layers 11b and 11c that are situated on the viewer's side of the partial selective reflection layer 11a and is thus partially lost, light in the red (R) and blue (B) color wave ranges that are reflected at the partial selective reflection layers 11b and 11c and return to the viewer's side are not so much lost as the light in the green (G) color wave range. This is because, only the partial selective reflection layer 11c exists on the viewer's side of the partial selective reflection layer 11b that selectively reflects light in the blue (B) color wave range, and no partial selective reflection layer exists on the viewer's side of the partial selective reflection layer 11c that selectively reflects light in the red (R) color wave range. For the above-described reason, the loss of light in the wave ranges for red (R) and blue (B) colors whose visibility is low is minimized, and the polarized-light selective reflection layer 11 can reflect light in the red (R), green (G) and blue (B) color wave ranges so that the reflected light is excellent in balance from the viewpoint of visibility. The projection screen can thus sharply display an image.

Further, according to this embodiment, the partial selective reflection layers 11a, 11b and 11c in the polarized-light selective reflection layer 11 selectively reflect only a specific polarized-light component (e.g., right-handed circularly polarized light) owing to the polarized-light-separating property of the cholesteric liquid crystalline structures, so that the polarized-light selective reflection layer 11 can be made to reflect only approximately 50% of the unpolarized environmental light such as sunlight and light from lighting fixtures that are incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the partial selective reflection layers 11a, 11b and 11c in the polarized-light selective reflection layer 11 selectively reflect (e.g., right-handed circularly polarized light), the partial selective reflection layers 11a, 11b and 11c in the polarized-light selective reflection layer 11 can reflect nearly 100% of the imaging light projected, that is, the polarized-light selective reflection layer 11 can efficiently reflect the imaging light.

Furthermore, according to this embodiment, since each partial selective reflection layer 11a, 11b or 11c in the polarized-light selective reflection layer 11 has a structurally non-uniform, cholesteric liquid crystalline structure in which the helical-structure parts 30 have helical axes extending in different directions, the polarized-light selective reflection layer 11 reflects imaging light not by specular reflection but by diffuse reflection, and the reflected light can thus be well recognized as an image. At this time, owing to structural non-uniformity in the cholesteric liquid crystalline structure, each partial selective reflection layer 11a, 11b or 11c in the polarized-light selective reflection layer 11 diffuses light that is selectively reflected, so that it can reflect a specific polarized-light component (e.g., right-handed circularly polarized light 31R in the selective reflection wave range) while diffusing it, and, at the same time, transmit the other light components (e.g., left-handed circularly polarized light 31L in the selective reflection wave range, and right-handed circularly polarized light 32R and left-handed circularly polarized light 32L not in the selective reflection wave range) without diffusing them. For this reason, the environmental light and imaging light that pass through the partial selective reflection layers 11a, 11b and 11c in the polarized-light selective reflection layer 11 do not undergo so-called depolarization, that is, the disturbance of the state of polarization, and it is thus possible to improve image visibility while maintaining the polarized-light-separating property inherent in the polarized-light selective reflection layer 11.

Figure 3:
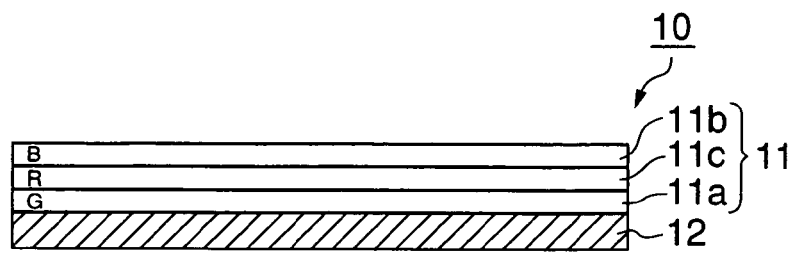
FIG. 3 is a diagrammatic sectional view showing a modification of the projection screen shown in FIG. 1.

In the above-described embodiment, explanation has been given by referring to the case where the partial selective reflection layer 11a that selectively reflects light in the green (G) color wave range, the partial selective reflection layer 11b that selectively reflects light in the blue (B) color wave range, and the partial selective reflection layer 11c that selectively reflects light in the red (R) color wave range are successively laminated in this order from the substrate 12 side, as shown in FIG. 1, to form the polarized-light selective reflection layer 11. However, the order in which the partial selective reflection layers 11a, 11b and 11c are laminated is not limited to the above-described one. Namely, as long as the partial selective reflection layer 11a that selectively reflects light in the green (G) color wave range is provided on the side opposite to the imaging-light-incident side (on the substrate 12 side), the other two partial selective reflection layers may be formed in any order; that is, the partial selective reflection layer 11a that selectively reflects light in the green (G) color wave range, the partial selective reflection layer 11c that selectively reflects light in the red (R) color wave range, and the partial selective reflection layer 11b that selectively reflects light in the blue (B) color wave range may be successively laminated in this order from the substrate 12 side, as shown in FIG. 3. This is because light in the red (R) and blue (B) color wave ranges have visibility that is lower than that of light in the green (G) color wave range, so that either the partial selective reflection layer 11b or 11c may be provided as the outermost layer on the viewer's side.

Figure 4:
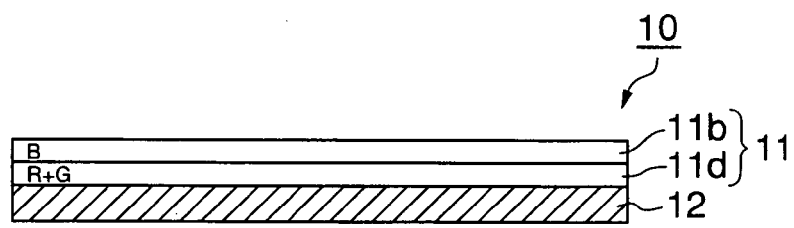
FIG. 4 is a diagrammatic sectional view showing another modification of the projection screen shown in FIG. 1.

In the above-described embodiment, explanation has been given by referring to the case where the wave ranges for red (R), green (G) and blue (B) colors are three independent selective reflection wave ranges and where these three selective reflection wave ranges are realized by the corresponding three partial selective reflection layers 11a, 11b and 11c. However, if at least two of the three wave ranges for red (R), green (G) and blue (B) colors are continuous, two partial selective reflection layers may be used to form the polarized-light selective reflection layer 11. For example, if the red (R) and green (G) color wave ranges are included in one selective reflection wave range, the polarized-light selective reflection layer 11 has such a construction as is shown in FIG. 4. Namely, a partial selective reflection layer 11d that selectively reflects light in the red (R) and green (G) color wave ranges and a partial selective reflection layer 11b that selectively reflects light in the blue (B) color wave range are laminated in this order from the substrate 12 side. Even in this case, the partial selective reflection layer 11d that selectively reflects light in the green (G) color wave range is provided on the side opposite to the imaging-light-incident side (on the substrate 12 side), so that the loss of light in the wave ranges for red (R) and blue (B) colors whose visibility is low is minimized. Therefore, even such a polarized-light selective reflection layer 11 can reflect light in the red (R), green (G) and blue (B) color wave ranges so that the reflected light is excellent in balance from the viewpoint of visibility.

As mentioned in the above embodiment, most preferably used as the polarized-light selective reflection layer 11 is one comprising the partial selective reflection layers 11a, 11b and 11c that have structurally non-uniform, cholesteric liquid crystalline structures. It is, however, also possible to use the following polarized-light selective reflection layer.

Namely, in the above-described embodiment, the polarized-light selective reflection layer 11 comprises, as the partial selective reflection layers 11a, 11b and 11c, those ones having cholesteric liquid crystalline structures, owing to which they selectively reflect either right- or left-handed circularly polarized light. It is, however, also possible to use, instead of such a polarized-light selective reflection layer 11, a layer having a structure that causes the layer to selectively reflect linearly polarized light of one vibration direction, like a linear polarizing element such as a multi-layered reflective polarizer.

Further, in the above-described embodiment, those partial selective reflection layers that diffuse, owing to structural non-uniformity in their cholesteric liquid crystalline structures, light that is selectively reflected are used as the partial selective reflection layers 11a, 11b and 11c in the polarized-light selective reflection layer 11. However, as long as the image visibility is ensured, it is possible to use partial selective reflection layers whose cholesteric liquid crystalline structures are in the state of planar orientation and reflect, by specular reflection, light that is selectively reflected.

Furthermore, in the above-described embodiment, each partial selective reflection layer 11a, 11b or 11c itself in the polarized-light selective reflection layer 11 has diffusing properties. The present invention is not limited to this, and a diffusing element that diffuses light reflected from the polarized-light selective reflection layer 11 may be provided separately from the polarized-light selective reflection layer 11.

Figure 5:
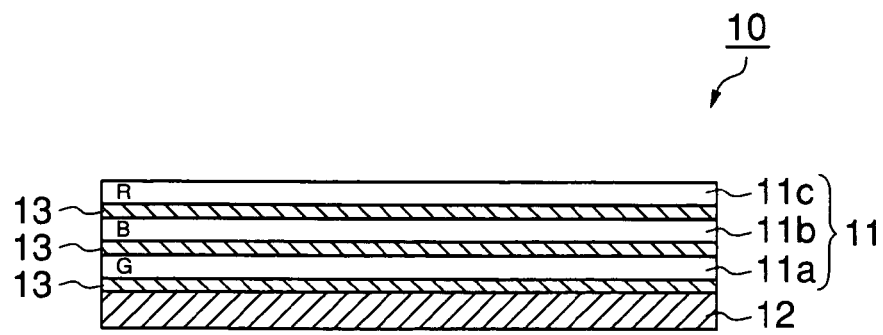
FIG. 5 is a diagrammatic sectional view showing a further modification of the projection screen shown in FIG. 1.

Furthermore, in the above-described embodiment, a material whose surface to which the liquid crystalline composition will be applied has no aligning power is preferably used as the substrate 12. However, even if a material whose surface to which the liquid crystalline composition will be applied has aligning power is used as the substrate 12, it is possible to control the orientation of the cholesteric liquid crystalline structure of the partial selective reflection layers 11a, 11b and 11c by providing an intermediate layer 13, such as an adherent layer, between the substrate 12 and the partial selective reflection layer 11a in the polarized-light selective reflection layer 11, as shown in FIG. 5, thereby directing, to a plurality of directions, the directors of liquid crystalline molecules constituting the cholesteric liquid crystalline structure of the partial selective reflection layer 11a, existing in the vicinity of the intermediate layer 13. By providing an intermediate layer 13 such as an adherent layer, it is also possible to improve the adhesion between the partial selective reflection layer 11a and the substrate 12. For such an intermediate layer 13, any material can be used as long as it is highly adherent to both the material for the polarized-light selective reflection layer 11 (the partial selective reflection layer 11a) and the material for the substrate 12, and it is possible to use commercially available materials. Specific examples of materials that can be used for the intermediate layer 13 include an adherent-layer-containing PET film A4100 manufactured by Toyobo Co., Ltd., Japan and adherent materials AC-X, AC-L and AC-W manufactured by Panack Co., Ltd., Japan. A black pigment or the like may be incorporated in the intermediate layer 13, thereby using the intermediate layer 13 as a light-absorbing layer capable of absorbing light in the visible region, as in the case of the substrate 12. Further, such an intermediate layer 13 as an adherent layer may be provided between each neighboring two of the partial selective reflection layers 11a, 11b and 11c that are laminated to the substrate 12.

Figure 6A:
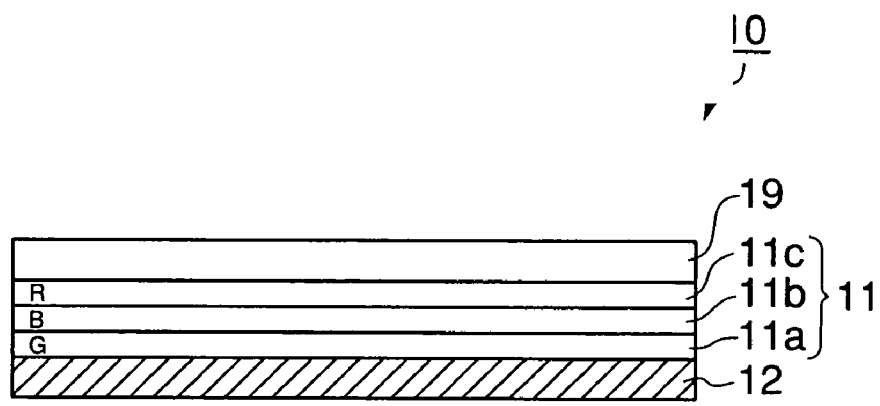
FIGS. 6A and 6B are diagrammatic sectional views showing still further modifications of the projection screen shown in FIG. 1.

Furthermore, in the above-described embodiment, a functional layer 19 may be provided on the viewer's side surface of the projection screen 10 (the polarized-light selective reflection layer 11), as shown in FIG. 6A. A variety of layers including a hard coat (HC) layer, an anti-glaring (AG) layer, an anti-reflection (AR) layer, an ultraviolet-light-absorbing (UV-absorbing) layer and an antistatic (AS) layer can be used as the functional layer 19.

The hard coat (HC) layer is for protecting the surface of the projection screen 10 and preventing it from being scratched or staining. The anti-glaring (AG) layer is for preventing the projection screen 10 from glaring. The anti-reflection (AR) layer is for preventing the surface of the projection screen 10 from reflecting light. The ultraviolet-light-absorbing (UV-absorbing) layer is for absorbing ultraviolet light that is contained in light incident on the projection screen 10 and causes yellowing of the liquid crystalline composition. The antistatic (AS) layer is for removing static electricity generated in the projection screen 10. In the case where the functional layer 19 is the antistatic layer, this layer is not necessarily provided on the viewer's side surface of the projection screen 10 and may be provided on the back surface of the substrate 12. Moreover, carbon particles or the like may be incorporated in the substrate 12, thereby imparting, to the substrate 12 itself, the property of removing static electricity.

The functional layer 19 serving as an anti-glaring layer has the property of preventing the surface of the projection screen 10 from mirroring viewers and their surroundings, and is significant for clear image recognition. A transparent layer with a roughened surface is preferably used as the anti-glaring layer, and by the use of such a layer, it is possible to effectively prevent mirroring of objects that occurs on the surface of the projection screen 10 because of interfacial reflection. Such a transparent layer can be obtained by roughening the surface of a transparent resin, glass, or the like by such a method as sandblasting, transfer of the shape of a mold surface, or chemical treatment. The surface of a transparent layer may be roughened either irregularly or regularly. To maintain the polarized-light-separating property of the polarized-light selective layer 11, it is preferable that the anti-glaring layer be isotropic with respect to refractive index. Examples of materials useful for the anti-glaring layer include glass, resins such as acrylic resins and polyester resins, and TAC (triacetyl cellulose) films with matte surfaces.

Figure 6B:
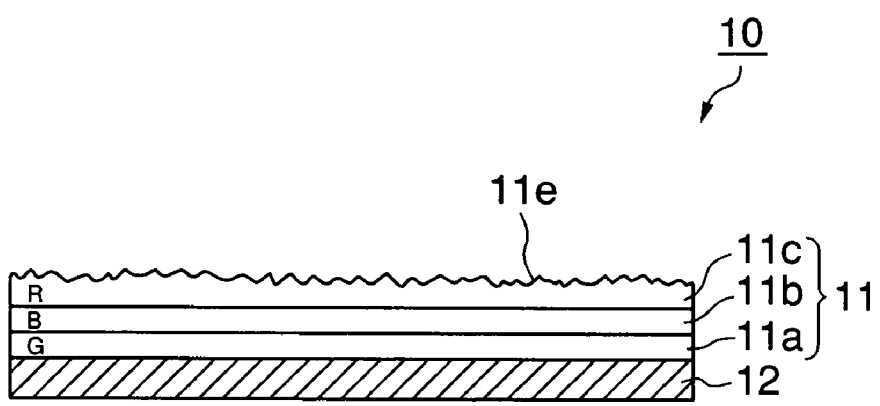

To impart anti-glaring properties to the projection screen 10, either of the following two methods can be used: the functional layer 19 serving as an anti-glaring layer is formed separately from the polarized-light-selective reflection layer 11, as shown in FIG. 6A; or the viewer's side surface of the polarized-light selective reflection layer 11 (or the surface of the partial selective reflection layer 11*c*, the outermost layer on the viewer's side) is roughened (see reference numeral 11*e*), as shown in FIG. 6B, thereby imparting anti-glaring properties to the polarized-light selective reflection layer 11 itself.

Although the above embodiment is described by referring to the case where the substrate 12 of the projection screen 10 is an absorptive substrate containing a light-absorbing layer capable of absorbing light in the visible region, the substrate 12 may also be a transparent substrate capable of transmitting at least part of light in the visible region. If a transparent substrate is used, although the advantage of enhancing image contrast is lost, the projection screen 10 is highly transparent while not displaying an image and the background can thus be clearly seen through the projection screen 10. Such a projection screen 10 can be used in decorative applications; for example, it is fit for use on a show window. Moreover, by switching the viewing angle according to the situation, it is possible to produce a more effective eye-catching effect. For this reason, this projection screen 10 can overcome the drawback of conventional information tools using projectors that they do not look attractive in a bright environment, and can effectively be used in such applications as billboards, bulletin boards, and guideboards. Although the transparent substrate is preferably less hazy, any material selected from acrylic resins, glass, vinyl chloride resins, etc. may be used as long as it can transmit light. Further, the transparent substrate is not necessarily colorless, and a colored one may also be used. Specifically, it is possible to use transparent plastic or glass plates in a color of brown, blue, orange, or the like that are usually used for partition walls, windows, and so forth.

Furthermore, the above embodiment includes, as mentioned above, an intermediate layer 13 having adhesion properties (an adherent layer) and provided between the polarized-light selective reflection-layer 11 and the substrate 12, or between each neighboring two of the partial selective reflection layers 11*a*, 11*b* and 11*c* that constitute the polarized-light selective reflection layer 11. The intermediate layer 13 may have barrier properties in addition to (or in place of) the adhesion properties. The barrier properties herein mean the following action: when the polarized-light selective reflection layer is laminated directly to the substrate, or when one partial selective reflection layer is laminated directly to another partial selective reflection layer, the constituents of the lower layer are prevented from migrating to (permeating through) the upper layer, or the constituents of the upper layer are prevented from migrating to (permeating through) the lower layer owing to the barrier properties. If substances migrate between the upper and lower layers, the optical properties (wavelength selectivity, polarized-light selectivity, diffusing properties, etc.) inherent in the polarized-light selective reflection layer (or the partial selective reflection layers) that is the upper or lower layer are impaired. However, this can be prevented by the use of the above-described intermediate layer having barrier properties (barrier layer). Specifically, for example, in the case where a partial selective reflection layer is laminated to another partial selective reflection layer by applying a cholesteric liquid crystalline composition, there is a possibility that a nematic liquid crystal component contained in the liquid crystalline composition for forming the upper partial selective reflection layer permeates through the lower partial selective reflection layer to change (increase) the helical pitch in the lower partial selective reflection layer, depending on a kind of cholesteric liquid crystalline composition or process conditions. However, even in this case, if a barrier layer is provided between the lower and upper partial selective reflection layers, the migration (permeation) of the nematic liquid crystal component does not occur, and the optical properties (wavelength selectivity, polarized-light selectivity, diffusing properties, etc.) of the partial selective reflection layers are successfully maintained.

Examples of materials that can be used for forming such a barrier layer include modified acrylates, urethane acrylates, polyester acrylates, and epoxy resins. These compounds may be either monofunctional or polyfunctional and include monomers and oligomers. Specific examples of these compounds include ethoxylated trimethylolpropane triacrylate, propoxylated glyceryl triacrylate, pentaerythritol tetraacrylate, ditrimethylolpropane tetraacrylate, dipentaerythritol hydroxypentaacrylate, ethoxylated pentaerythritol tetraacrylate, pentaacrylic ester, pentaerythritol triacrylate, trimethylolpropane triacrylate, trimethylolpropane PO-modified triacrylate, isocyanuric acid EO-modified triacrylate, trimethylolpropane EO-modified triacrylate, dipentaerythritol penta- or hexa-acrylate, urethane adducts, aliphatic polyamine epoxy resins, polyaminoamide epoxy resins, aromatic diamine epoxy resins, alicyclic diamine epoxy resins, phenolic epoxy resins, amino epoxy resins, mercaptan epoxy resins, dicyandiamide epoxy resins, and Lewis acid complex epoxy resins.

Projection System

Figure 7:
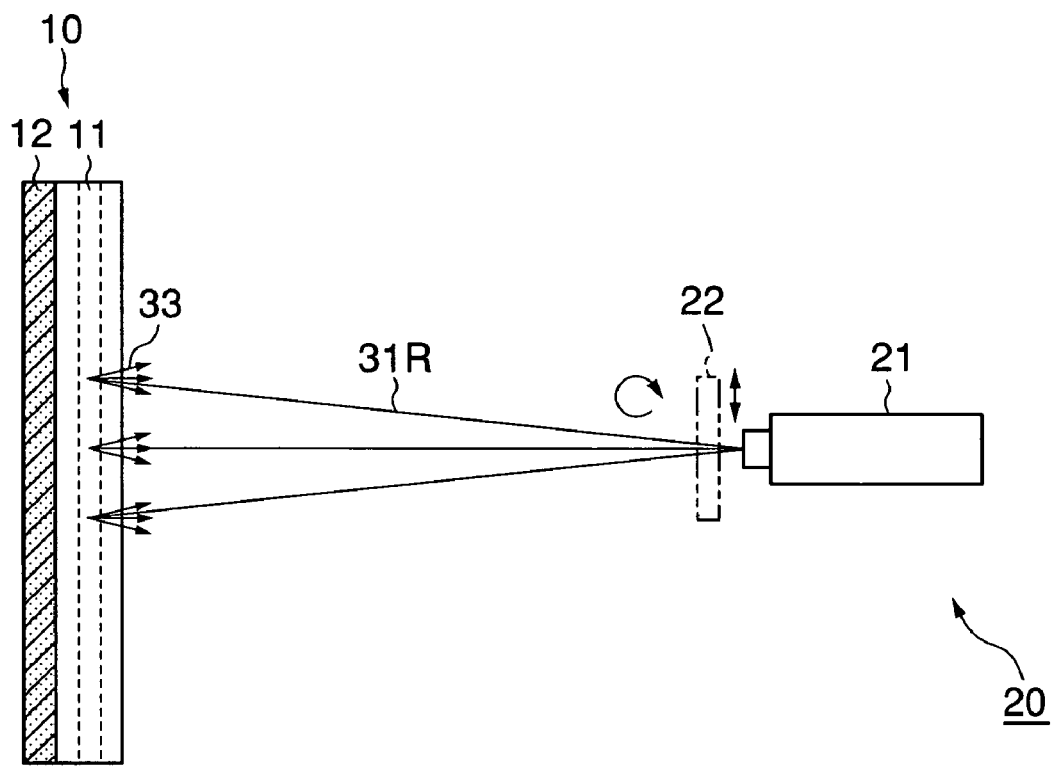
FIG. 7 is a diagrammatic view showing an example of a projection system comprising a projection screen according to an embodiment of the present invention.

The aforementioned projection screen 10 can be incorporated into a projection system 20 comprising a projector 21, as shown in FIG. 7.

As shown in FIG. 7, the projection system 20 comprises the projection screen 10 and the projector 21 for projecting imaging light on the projection screen 10.

Of these components, the projector 21 may be of any type, and a CRT projector, a liquid crystal projector, a DLP (digital light processing) projector, or the like can be used. It is, however, preferable that the imaging light to be projected on the projection screen 10 from the projector 21 chiefly contains a polarized-light component (e.g., right-handed circularly polarized light) that is identical with the polarized-light component which the projection screen 10 selectively reflects.

Because of its operating principle, a liquid crystal projector useful as the projector 21 usually emits light that is polarized substantially linearly. In this case, by letting the imaging light emerge from the projector 21 through a retardation layer 22 or the like, it is possible to convert the linearly polarized light into circularly polarized light without causing the loss of the amount of light.

A quarter wave plate is preferably used as the retardation layer 22. Specifically, an ideal retardation layer is one capable of causing a phase shift of 137.5 nm for light of 550 nm whose visibility is highest. Further, a wide-wave-range quarter wave plate is more preferable because it is applicable to light in all of the red (R), green (G) and blue (B) color wave ranges. It is also possible to use a single retardation layer produced by controlling the birefringence of a material for this layer, or a retardation layer using a quarter wave plate in combination with a half wave plate.

The retardation layer 22 may be externally attached to the exit-aperture of the projector 21, as shown in FIG. 7, or incorporated-into the inside of the projector 21.

In the case where a CRT or DLP projector is used as the projector 21, since the projector 21 emits unpolarized light, it is necessary to use a circular polarizer composed of a linear polarizer and a retardation layer in order to convert the unpolarized light into circularly polarized light. If such a circular polarizer is used, although the amount of light emitted from the projector 21 itself is decreased to half, it is possible to effectively prevent the production of stray light or the like from a polarized-light component (e.g., left-handed circularly polarized light) that is different from the polarized-light component which the polarized-light selective reflection layer 11 in the projection screen 10 selectively reflects, thereby enhancing image contrast.

A projector 21 usually attains color display utilizing light in the wave ranges for red (R), green (G) and blue (B) colors, the three primary colors. For example, assuming that light enters the projection screen 10 vertically to it, the projector 21 projects light in selective reflection wave ranges whose centers are between 430 nm and 460 nm, between 540 nm and 570 nm, and between 580 nm and 620 nm.

EXAMPLES

The present invention will now be explained more specifically by referring to the following Example and Comparative Example.

(Example)

A first cholesteric liquid crystal solution having a selective reflection wave range with a center wavelength of 550 nm was prepared by dissolving, in cyclohexanone, a monomer-containing liquid crystal consisting of a main component (95% by weight), an ultraviolet-curing nematic liquid crystal, and a polymerizable chiral agent (5% by weight). A liquid crystal containing a compound represented by the above chemical formula (2-xi) was used as the nematic liquid crystal. A compound represented by the above chemical formula (5) was used as the polymerizable chiral agent. To the first cholesteric liquid crystal solution was added 5% by weight of an acetophenone photopolymerization initiator available from Ciba Specialty Chemicals K. K., Japan.

By a bar coating method, the above-prepared first cholesteric liquid crystal solution was applied to a black-colored acrylic sheet with a surface area of 200 mm□ (200 mm×200 mm).

This acrylic sheet was heated in an oven at 80° C. for 90 seconds, thereby conducting aligning treatment (drying treatment). Thus, a cholesteric liquid crystal layer containing no solvent was obtained.

Thereafter, 10 mW/cm$^2$ of ultraviolet light with a wavelength of 365 nm was applied to this cholesteric liquid crystal layer in an atmosphere of nitrogen for 1 minute to cure the cholesteric liquid crystal layer, thereby obtaining a first partial selective reflection layer having a selective reflection wave range whose center wavelength was 550 nm.

Similarly, a second cholesteric liquid crystal solution was applied directly to the first partial selective reflection layer and then subjected to aligning treatment (drying treatment) and curing treatment. Thus, a second partial selective reflection layer having a selective reflection wave range with a center wavelength of 450 nm was obtained. The procedure used for preparing the second liquid crystal solution was the same as the procedure used for preparing the first liquid crystal solution, provided that the nematic liquid crystal and the chiral agent were mixed in such a proportion that the resulting layer had a selective reflection wave range with a center wavelength of 450 nm.

Similarly, a third cholesteric liquid crystal solution was applied directly to the second partial selective reflection layer and then subjected to aligning treatment (drying treatment) and curing treatment. Thus, a third partial selective reflection layer having a selective reflection wave range with a center wavelength of 600 nm was obtained. The procedure used for preparing the third liquid crystal solution was the same as the procedure used for preparing the first liquid crystal solution, provided that the nematic liquid crystal and the chiral agent were mixed in such a proportion that the resulting layer had a selective reflection wave range with a center wavelength of 600 nm.

Thus, there was obtained a projection screen comprising a polarized-light selective reflection layer composed of the first partial selective reflection layer capable of selectively reflecting light in the green (G) color wave range (light in a selective reflection wave range with a center wavelength of 550 nm), the second partial selective reflection layer capable of selectively reflecting light in the blue (B) color wave range (light in a selective reflection wave range with a center wavelength of 450 nm), and the third partial selective reflection layer capable of selectively reflecting light in the red (R) color wave range (light in a selective reflection wave range with a center wavelength of 600 nm), successively laminated in this order from the substrate side. The thickness of the first partial selective reflection layer was made 4 µm, that of the second partial selective reflection layer was made 3 μm, and that of the third partial selective reflection layer was made 5 μm. These partial selective reflection layers constituting the polarized-light selective reflection layer in the projection screen had cholesteric liquid crystalline structures that were not in the state of planar orientation.

(Comparative Example)

A projection screen was produced in the same manner as in the above Example, provided that the first, second and third cholesteric liquid crystal solutions were applied in the order different from that in Example. Thus, there was obtained a projection screen comprising a polarized-light selective reflection layer composed of the first partial selective reflection layer capable of selectively reflecting light in the blue (B) color wave range (light in a selective reflection wave range with a center wavelength of 450 nm), the second partial selective reflection layer capable of selectively reflecting light in the green (G) color wave range (light in a selective reflection wave range with a center wavelength of 550 nm), and the third partial selective reflection layer capable of selectively reflecting light in the red (R) color wave range (light in a selective reflection wave range with a center wavelength of 600 nm), successively laminated in this order from the substrate side.

(Results of Evaluation)

Imaging light emitted from a projector was projected on the projection screen of Example and that of Comparative Example, and the contrast values were determined. In this measurement, a liquid crystal projector ("ELP-52" manufactured by Epson Co., Ltd., Japan) was used as the projector.

In order to convert the imaging light emitted from the projector into circularly polarized light, a circular polarizer was placed on the exit aperture of the projector. A fluorescent lamp (emitting unpolarized light) fixed to the ceiling was used to illuminate the room in which the projector and each projection screen were placed, where the projection screen and the fluorescent lamp were arranged so that the light from the fluorescent light directly entered the projection screen at an angle of approximately 50°. The illumination intensity on the projection screen right under the fluorescent lamp, measured by an illuminometer (a digital illuminometer "510-02" manufactured by Yokogawa M & C Co., Ltd., Japan), was 200 lx.

The projection screen was set vertically to the floor. The projector was placed at such a point that the horizontal distance (in parallel with the floor) between the projector and the projection screen was approximately 2.5 m.

Imaging light (a still image composed of white and black areas) was projected on the projection screen from the projector, and the image contrast was determined. Specifically, the luminance of the white area and that of the black area in the center of the projection screen were measured by a luminance meter "BM-8" manufactured by Topcon Corp., Japan, and the ratio between these two luminances was obtained as the image contrast [contrast=(luminance of white area)÷(luminance of black area)].

The contrast values of the images projected on the projection screen of Example and that of Comparative Example are shown in Table 1. As is clear from Table 1, the images displayed on the projection screen of Example and that of Comparative Example were found to have satisfactorily high contrast.

TABLE 1

| Sample | Example | Comparative Example |
| --- | --- | --- |
| Contrast | 30 | 30 |

Further, the images on these projection screens were visually observed. They were found excellent.

However, the color of the image displayed on the projection screen of Example was found more vivid than that of the image displayed on the projection screen of Comparative Example, when the imaging light (a still image of a red-, green- and blue-colored pattern) projected on each projection screen from the projector was visually observed slantingly against the imaging light incident on the projection screen (at an angle of 15° or more with the normal to the screen plane, where the angle of the normal is 0°).

What is claimed is:

1. A projection screen for displaying an image by reflecting projected imaging light, comprising:
    a polarized-light selective reflection layer that selectively reflects a specific polarized-light component and comprises at least two partial selective reflection layers laminated to each other;
   wherein:
    each of the partial selective reflection layers has a structure for selectively reflecting a specific polarized-light component;
    each of the structures of the partial selective reflection layers is configured so that the partial selective reflection layers selectively reflect light in different wave ranges for red (R), green (G) and blue (B) colors; and
    in the polarized-light selective reflection layer, the partial selective reflection layer that selectively reflects light in the green (G) color wave range is situated farthest from the imaging-light-incident side of the projection screen relative to the other partial selective reflection layers.

2. The projection screen according to claim 1, wherein the specific polarized-light component is right- or left-handed circularly polarized light.

3. The projection screen according to claim 1, wherein the specific polarized-light component is linearly polarized light of one vibration direction.

4. The projection screen according to claim 1, further comprising a diffusing element that diffuses light that is reflected from the partial selective reflection layers in the polarized-light selective reflection layer.

5. The projection screen according to claim 1, wherein the partial selective reflection layers themselves in the polarized-light selective reflection layer have diffusing properties.

6. The projection screen according to claim 5, wherein the partial selective reflection layers in the polarized-light selective reflection layer have cholesteric liquid crystalline structures and, owing to structural non-uniformity in the cholesteric liquid crystalline structures, diffuse light that is selectively reflected.

7. The projection screen according to claim 6, wherein the cholesteric liquid crystalline structure of each of the partial selective reflection layers comprises a plurality of helical-structure parts that are different in direction of helical axis.

8. The projection screen according to claim 1, further comprising a substrate that supports the polarized-light selective reflection layer comprising the partial selective reflection layers, situated underneath the partial selective reflection layer that selectively reflects light in the green (G) color wave range.

9. The projection screen according to claim 8, wherein the substrate is an absorptive substrate comprising a light-absorbing layer that absorbs light in a visible region.

10. The projection screen according to claim 8, wherein the substrate is a transparent substrate that transmits at least part of light in a visible region.

11. The projection screen according to claim 1, further comprising an intermediate layer having adhesion properties, provided between each neighboring two of the partial selective reflection layers in the polarized-light selective reflection layer.

12. The projection screen according to claim 1, further comprising an intermediate layer having barrier properties, provided between each neighboring two of the partial selective reflection layers in the polarized-light selective reflection layer.

13. The projection screen according to claim 1, further comprising a functional layer containing at least one layer selected from a group consisting of a hard coat layer, an anti-glaring layer, an anti-reflection layer, an ultraviolet-light-absorbing layer and an antistatic layer.

14. The projection screen according to claim 13, wherein the functional layer is an anti-glaring layer that comprises a layer with an irregularly roughened surface, isotropic with respect to refractive index.

15. The projection screen according to claim 14, wherein the anti-glaring layer is a TAC film with a matte surface.

16. The projection screen according to claim 1, wherein the imaging-light-incident-side surface of the polarized-light selective reflection layer is roughened, and the polarized-light selective reflection layer shows anti-glaring properties because of the roughened surface.

17. The projection screen according to claim 1, wherein each of the partial selective reflection layers is made from a polymerizable, liquid crystalline material.

18. A projection system comprising:
   a projection screen according to claim 1; and
   a projector that projects imaging light on the projection screen.

* * * * *